United States Patent Office 3,584,064
Patented June 8, 1971

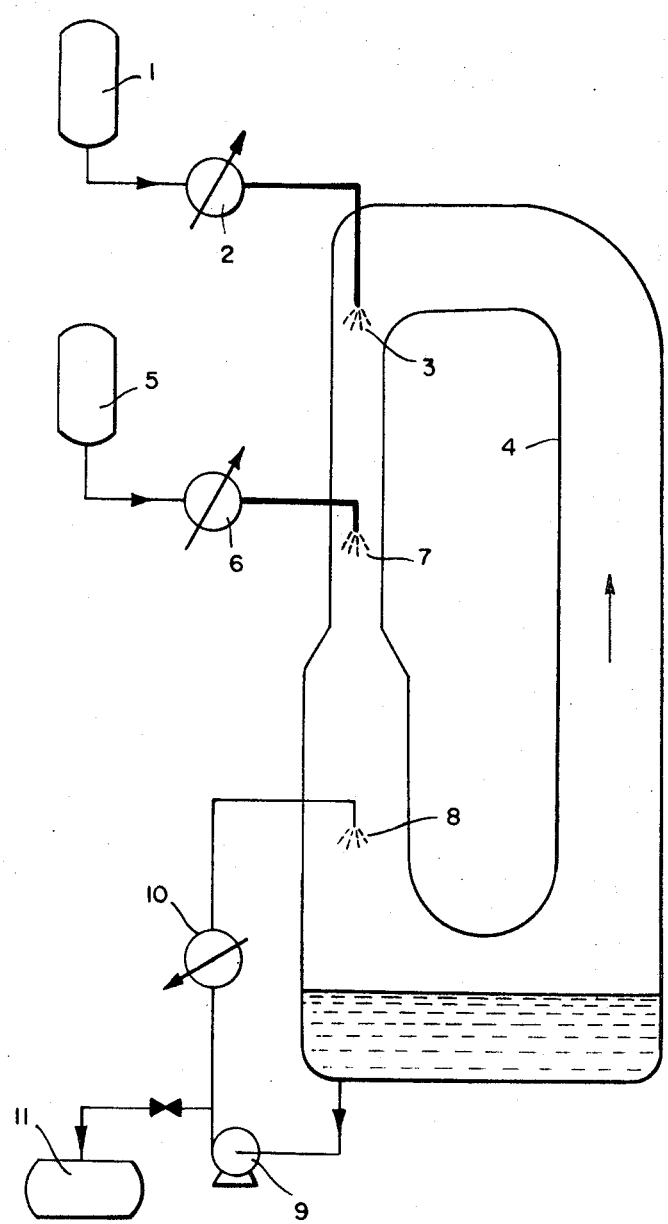

3,584,064
CONTINUOUS MANUFACTURE OF DIBROMOBUTENES
Hans-Martin Weitz, Frankenthal, Pfalz, Berthold Hausdoerfer, Ludwigshafen (Rhine), and Juergen Koopmann, Neustadt an der Weinstrasse, Germany, assignors to Badische Anilin- & Soda-Fabrik Aktiengesellschaft, Ludwigshafen (Rhine), Germany
Filed Feb. 8, 1967, Ser. No. 614,605
Claims priority, application Germany, Feb. 16, 1966, B 85,824
Int. Cl. C07c 21/14
U.S. Cl. 260—654      2 Claims

ABSTRACT OF THE DISCLOSURE

A process for the continuous production of dibromobutenes by the reaction of butadiene with bromine in the gas phase, in which butadiene is used in more than double the stoichiometric amount and the reactants are in turbulent flow. Dibromobutenes are intermediates for polyamides of the nylon-6,6 type.

---

This invention relates to a new process for the production of dibromobutenes from butadiene and bromine.

It is known that the interaction of butadiene and bromine proceeds in stages, the dibromobutenes first formed reacting with further bromine to form tetrabromobutane. In order to achieve high yields of dibromobutenes, it has been proposed to carry out the reaction in the presence of inert solvents at temperatures between —30° and —10° C. (cf. Houben-Weyl-Müller, "Methoden der organischen Chemie," vol. 5/4, 82 and 83 (1960)). This process is unsatisfactory in practice as removal of reaction heat at low temperatures offers difficulty and also because large amounts of solvents are required.

It has also been attempted to carry out the reaction in the gas phase in the absence of solvents. U.S. Pat. 2,484,042 describes a process for the production of dichlorobutenes by the interaction of chlorine and butadiene in the gas phase in which the reaction mixture is passed immediately into water. Although the process is said to be also suitable for the production of bromine analogs, experience has shown that the yields of dibromobutenes are low and byproducts are formed, particularly butadiene bromohydrin.

U.S. Pat. 2,453,089 suggests that butadiene be halogenated in the gas phase at temperatures between 60° C. and the boiling point of the product produced in the process, the reactants being used in the ratio of from 0.8 to 1.3 moles of halogen per mole of butadiene. The yield is said to drop off sharply when larger or smaller proportions of halogen are used. However, the yields of dibromobutanes obtainable by the said process are unsatisfactory even when the specified molar ratio is used.

It is an object of the present invention to provide a process for the production of dibromobutenes from butadiene and bromine in which no solvent is required, the reaction heat can be easily removed, no butadiene bromohydrin is formed as byproduct and the product is obtained in very high yields and high purity. Other objects and advantages of the invention will be apparent from the following detailed description.

These objects are achieved in a process for the production of dibromobutenes from butadiene and bromine in the gas phase by using butadiene in more than double the stoichiometric amount and maintaining the reactants in turbulent flow.

The new process has a number of advantages, for example the removal of the reaction heat offers no difficulty, no solvent is required, and the dibromobutenes obtained contain only very small amounts of byproducts, e.g. tetrabromobutane, so that they can be used without purification.

To carry out the reaction, the butadiene and bromine are mixed in the gas phase in the molar ratio of at least 2:1, in general from 2.5:1 to 250:1, preferably from 10:1 to 250:1, especially from 50:1 to 250:1. It is essential that turbulent flow conditions should prevail in the reaction zone in order that mixing takes place extremely rapidly and local excess concentrations of bromine may be substantially avoided. Turbulent flow may for example be produced by intensely mixing the gases by means of an impeller, by providing perforated plates in the reaction chamber or preferably by means of nozzles, especially mixing nozzles. The state of flow is defined by the Reynolds number. Turbulent flow is present when the Reynolds number is higher than 2,300. In general, the Reynolds number is between 2,300 and $2=10^9$, preferably between 3,000 and $5 \times 10^8$.

The reaction proceeds at a very high rate and is often complete within fractions of a second. The reaction proceeds substantially adiabatically, i.e. the mixture of the components, which are used for example at a temperature between 0° and 100° C., absorbs practically all of the reaction heat and is thereby heated up by for example 3 to 200° C. according to the excess of butadiene used.

The pressure in the reaction zone is normally 1 atm. abs. or somewhat higher, it is however also possible to use a pressure below or above atmospheric, for example between 0.2 and 3 atmospheres or higher.

On completion of the reaction the gas mixture is cooled, for example by injecting cold dibromobutene. Unreacted butadiene can be easily separated from the reaction product owing to the very great difference in boiling points, and is recycled to the process.

The invention will now be further described with reference to the accompanying drawing which, in diagrammatic form, shows an embodiment of apparatus particularly adapted to carrying out the invention.

Butadiene is introduced into the loop-shaped reaction chamber 4 from storage vessel 1 via evaporator 2 through nozzle 3, and bromine is introduced into the reactor from storage vessel 5 via evaporator 6 through nozzle 7. Both butadiene and bromine are introduced at a temperature at which the mixture is gaseous at the pressure prevailing in the reaction chamber. It is preferred to supply both reactants in gaseous form, butadiene at a temperature of for example 0° to 50° C. and bromine at a temperature of for example 50° to 100° C. The reactants enter the reaction chamber at such a velocity that the impulse transmitted to the gas contained in the loop causes the gas to circulate, and the butadiene concentration in the zone between 7 and 8 where the reaction takes place increases to a multiple of the stoichiometric amount. The reaction mixture heats up by 3° to 200° C. according to the amount of butadiene being recirculated and can be cooled by injecting dibromobutenes. For this purpose some of the dibromobutenes collecting at the bottom of the reaction vessel may be pumped by pump 9 to a condenser 10 and injected through nozzle 8. Dibromobutenes separate out from the reaction mixture in the form of drops. The product which is liquid at temperatures above 45° C. collects at the bottom of the reaction vessel and contains only very small amounts of dissolved butadiene. The unreacted butadiene flows upward on the righthand side of the apparatus, being aspirated by the fresh butadiene supplied through nozzle 3. As the reaction product contains only very small amounts of butadiene it is sufficient, in order to maintain a large excess of butadiene in the reaction zone, to supply the starting materials in a ratio which differs only very slightly from the stoichiometric ratio. The product can be discharged through tank 11. The dibromobutene mixture obtained comprises 1,2-dibromobutene-(3), trans-1,4-dibromobutene-(2) and cis-1,4-dibromobutene-(2). The product is of high purity and can be processed direct without purification.

The invention is further illustrated by, but not limited to, the following examples in which the percentages specified are by weight.

EXAMPLE 1

6.15 moles/h. of butadiene-(1,3) and 6.0 moles/h. of bromine are introduced in gaseous form into a loop filled with gaseous butadiene, as shown in the accompanying drawing at such a velocity that the impulse transmitted to the gas contained in the loop causes the gas to circulate and the butadiene concentration in the reaction zone increases to a 75 fold molar excess, the state of flow of the reactants being characterized by the Reynolds number 50,000. The recycle butadiene is cooled downstream of the reaction zone by injecting cold dibromobutene containing 0.3% of tetrabromobutane, so that a temperature of 115° C. is maintained in the reaction zone. The pressure is kept constant at 1.1 atm. abs. The mixture of dibromobutenes collecting at the bottom of the reaction vessel is discharged. Some of the mixture is cooled and recycled to the reaction chamber as coolant, as described above. The rest of the mixture is withdrawn as product and freed from dissolved butadiene by heating, the butadiene being recycled to the process. The mixture of dibromobutenes obtained contains only 0.3% of tetrabromobutane as impurity.

EXAMPLE 2

2.7 moles/h. of butadiene-(1,3) and 2.65 moles/h. of bromine are introduced in gaseous form into a loop filled with gaseous butadiene at such a velocity that the impulse transmitted to the gas contained in the loop causes the gas to circulate and the butadiene concentration in the reaction zone increases to an 11 fold molar excess, the state of flow of the reactants being characterized by the Reynolds number 6,000. A temperature of 95° C. is set up as a result of the heat lost in the apparatus. The mixture of dibromobutenes obtained contains 2.5% of tetrabromobutane.

EXAMPLE 3

The method of Example 2 is followed and 3.4 moles/h. of butadiene-(1,3) and 3.3 moles/h. of bromine are injected so that the impulse transmitted to the gas contained in the loop causes the gas to circulate and the butadiene concentration in the reaction zone increases to an 18 fold molar excess, the state of flow of the reactants being characterized by the Reynolds number 12,000. A temperature of 102° C. is set up in the reaction zone. The mixture of dibromobutenes obtained contains 1.0% of tetrabromobutane.

We claim:
1. A continuous process for the production of dibromobutenes by the reaction of a molar excess of butadiene with bromine in a gaseous phase which comprises: injecting butadiene and bromine into a loop-shaped reaction vessel containing a reaction zone and a condensing zone downstream of said reaction zone at a velocity sufficient to produce turbulent flow conditions in said reaction zone, recycling unreacted gases to the reaction zone of said vessel, said vessel being filled with butadiene before the reaction is started so that a butadiene: bromine ratio of from 2:1 to 250:1 is maintained in said reaction zone, injecting cool dibromobutenes into said condensing zone to cool and condense additional dibromobutenes from said gaseous phase and continuously removing dibromobutenes from the reaction vessel and cooling a portion of the removed dibromobutenes from injection into said condensing zone.

2. A process as in claim 1 wherein the reactants are injected into the reaction vessel in substantially equimolar amounts.

References Cited

UNITED STATES PATENTS

| 2,483,049 | 9/1949 | Hellyer et al. | 260—654H |
| 2,484,042 | 10/1949 | Mahler | 260—654H |
| 3,054,831 | 9/1962 | Samples et al. | 260—654H |

BERNARD HELFIN, Primary Examiner

J. A. BOSKA, Assistant Examiner

U.S. Cl. X.R.

260—655, 662